Patented Sept. 21, 1954

2,689,842

UNITED STATES PATENT OFFICE 2,689,842

RUBBER MILLED WITH CARBON BLACK AND HEXACHLOROPHENOL

Bernard C. Barton, Clifton, N. J., assignor to United States Rubber Company, New York, N. Y., a corporation of New Jersey No Drawing. Application November 4, 1952, Serial No. 318,759

4 Claims. (Cl. 260—41.5)

This invention relates to improvements in the technique of processing carbon black and rubber mixes prior to vulcanization thereof.

The technique of processing rubber mixes loaded with carbon black, prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and then subjecting the mixture to a heat treatment at a temperature substantially above 250° F., the preferred temperature being in the range from about 300° F. to 370° F., and masticating the mix during and/or after such heat treatment, or alternately therewith. The duration of the special heat treatment is varied with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration are said to be suitable for most purposes, particularly within the preferred temperature range.

The principal object of the present invention is to provide new chemical promoters for the processing of rubber and carbon black mixtures at relatively high temperatures as in processes of the general type disclosed in the above-mentioned Gerke patent. Such processing is often referred to as low-hysteresis processing and is usually designed to produce high electrical resistance and low torsional hysteresis, particularly in rubber stocks used for the manufacture of pneumatic tires and more particularly tread stocks. A further object is to bring about a substantial reduction in the time of such processing by the use of the herein disclosed chemicals whereby an important increase in the capacity and output of the equipment is obtained with the result that such processing is rendered more commercially feasible. Other objects and advantages of my invention will more fully hereinafter appear.

The present invention is based upon my discovery that a small amount of hexachlorophenol (also known as hexachloro-2,5-cyclohexadien-1-one) substantially decreases the time and/or lowers the temperature necessary for so-called low-hysteresis processing of rubber and carbon black mixes,—that is, the rate of the low-hysteresis-processing reaction at a given temperature is materially increased.

The process of my invention comprises mixing natural rubber or a synthetic rubbery polymer of an aliphatic conjugated diolefin, i. e., an aliphatic conjugated diolefin polymer or copolymer, with a relatively large amount of a rubber-reinforcing carbon black and a relatively small amount of hexachlorophenol, and heating this mixture at a temperature above 275° F. at which the rubber is not harmed, to bring about the desired changes in the rubber and carbon black mixture. Following the heat treatment, the vulcanizing and other desired compounding ingredients including conventional accelerators and the like are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as much as 100 parts per 100 parts of rubber.

My invention can be practiced with natural rubber, e. g., Hevea rubber, and with those unsaturated synthetic rubbers which are commonly considered to be equivalent to natural rubber or to display properties generally similar thereto, namely, polymers of aliphatic conjugated diolefins or mixtures of such diolefins with other unsaturated copolymerizable material. Examples of such polymers are synthetic rubbery polyisoprene and polybutadiene, and synthetic rubbery copolymers of butadiene or isoprene with such copolymerizable monomers as styrene, acrylonitrile, mono-vinylpyridines, methyl acrylate, methyl methacrylate, etc. I can even use "Butyl" rubber which, as is well known, is a rubbery copolymer of a major proportion of isobutylene and a minor proportion of a multi-olefinic unsaturate having from 4 to 14 carbon atoms per molecule, the multi-olefinic unsaturate usually being an aliphatic conjugated $C_4$ to $C_6$ diolefin, typically isoprene or butadiene, the proportions usually ranging from 90 to 99.5% of isobutylene and correspondingly from 10 to 0.5% of the multi-olefinic unsaturate. It has not heretofore been possible to apply low-hysteresis processing to Butyl rubber with any degree of success. However, by means of the chemical promoter of the present invention, it is possible to effect low-hysteresis processing of Butyl rubber and carbon black mixtures with outstanding success.

The hexachlorophenol is preferably employed in an amount ranging from 0.5 to 3.0 parts per 100 parts or rubber. Amounts in this range so speed up the attainment of the desired effects of the heat treatment as to be commercially important. Amounts smaller than 0.5 part can be used but do not give the desired acceleration of the action of the heat treatment. Amounts greater than 3.0 parts can be used but are generally uneconomical. Since hexachlorophenol is a relatively expensive chemical it is desirable to use as small an amount thereof as is consistent with an economically important acceleration in the effects of the heat treatment.

In the preferred practice of my invention the heat treatment of the mixture of rubber, carbon black and hexachlorophenol is carried out by mastication at temperatures in the range 275°–400° F., with any suitable type of masticating equipment such as an open two-roll rubber mill or more preferably an internal rubber mixer, especially a Banbury mixer. The Banbury mixer is particularly advantageous because it exerts a severe masticotory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary, depending upon many factors including the temperature of heat treatment, type of mixture, amount of hexachlorophenol, etc. In any event, it will be considerably shorter, at given temperature conditions, than the time required when the hexachlorophenol is omitted. Times of the order of 5 to 15 minutes will generally be adequate for the purposes of my invention. It is well known that different rubbers vary as to the highest temperatures they can withstand without harm and of course the temperature and duration of the heat treatment should be so regulated as not to impair the properties of the rubber. It is preferable to form an intimate mixture of the rubber, carbon black and hexachlorophenol at a relatively low temperature, e. g., not over 200° F., in order to avoid premature reaction of the hexachlorophenol whereby its promoting effect upon the low hysteresis processing would be seriously reduced.

The following examples illustrate the preferred method of practicing my invention. All parts are by weight.

EXAMPLE 1

A masterbatch is prepared by mixing together 100 parts of natural rubber, 50 parts of carbon black (a medium processing channel black known commercially as "Spheron #6") and 5 parts of stearic acid. This mixing operation is carried out in the conventional manner in a Banbury mixer or a two-roll rubber mill. To different portions of this masterbatch are added various amounts of hexachlorophenol on a two-roll rubber mill at a temperature well below 275° F., viz., at 150–225° F. The mill temperature is then raised to 300° F., and each mixture is masticated for 10 minutes. Thereafter the mill is cooled to 150–200° F. and 2 parts of pine tar, 2 parts of zinc oxide, 1 part of antioxidant, 1 part of accelerator, and 3 parts of sulfur are incorporated. The mixture is placed in a suitable mold and vulcanized 45 minutes at 287° F. As a control, an identical portion of the masterbatch is subjected to all the previously described manipulative steps except that no hexachlorophenol is added to the mixture. The specific electrical resistivity and torsional hysteresis are determined for the vulcanizates. The results are recorded in Table I.

Table I

| Parts of Hexachlorophenol | Log Resistivity | Torsional Hysteresis, (280° F.) |
| --- | --- | --- |
|  | 8.5 | 0.107 |
| 0.5 | 9.0 | 0.096 |
| 1.0 | 10.6 | 0.076 |
| 2.0 | 12.6 | 0.063 |
| 3.0 | >13.0 | 0.048 |

These data demonstrate the effectiveness of hexachlorophenol in reducing the torsional hysteresis and increasing the specific electrical resistivity of Hevea rubber containing a channel black.

EXAMPLE 2

In a manner similar to that of Example 1, experiments are carried out in which the duration of the hot milling is varied from five to twenty minutes at 300° F. The results are shown in Table II.

Table II

| Parts of Hexachlorophenol | Time at 300° F. (minutes) | Log Resistivity | Torsional Hysteresis, (280° F.) |
| --- | --- | --- | --- |
| 2.0 | 5 | 7.7 | .132 |
| 2.0 | 10 | 10.3 | .077 |
| 2.0 | 20 | 12.8 | .059 |
| 0.0 | 5 | 6.9 | .196 |
| 0.0 | 10 | 7.9 | .122 |
| 0.0 | 20 | 9.0 | .099 |

These data further demonstrate the effectiveness of hexachlorophenol in reducing the time necessary for "low-hysteresis" processing.

EXAMPLE 3

To portions of a masterbatch each consisting of 100 parts of an isobutylene-isoprene copolymer (known commercially as "Butyl-15") and 50 parts of carbon black (a medium processing channel black known commercially as "Spheron #6") were added various amounts of hexachlorophenol, at approximately 200° F. The mixtures were masticated in a Banbury mixer at various high temperatures, as shown in Table III. Thereafter, 3 parts of stearic acid, 3 parts of zinc oxide, 1 part of tetramethylthiuram disulfide, 0.5 part of 2-mercaptobenzothiazole, and 2 parts of sulfur are incorporated in each mixture, on a two-roll mill at a temperature of 150–200° F. The stocks were press-vulcanized 60 minutes at 293° F. The data are summarized in Table III.

Table III

| Parts of Hexachloro-phenol | Mastication | | Log Resist-ivity | Torsional Hysteresis, (280° F.) | ML-4* (212° F.) |
|---|---|---|---|---|---|
| | Time (min.) | Temp., ° F. | | | |
| 0.0 | 20 | 375 | 6.9 | .161 | 66 |
| 0.75 | 10 | 375 | 7.6 | .146 | 61 |
| 1.5 | 10 | 375 | 10.3 | .108 | 57 |
| 0.75 | 20 | 375 | 9.0 | .099 | 58 |
| 1.5 | 20 | 375 | >13.0 | .084 | 51 |
| .75 | 20 | 350 | 7.3 | .143 | 58 |
| 1.5 | 20 | 350 | 9.9 | .105 | 53 |
| 1.5 | 20 | 325 | 9.2 | .112 | 61 |

*(Mooney viscosity of the stock after the high-temperature mastication but before the incorporation of vulcanizing ingredients; measured with the large rotor after 4 minutes rotation.)

These data show that hexachlorophenol increases the specific electrical resistivity by a factor of up to 1,000,000, and reduces the torsional hysteresis by up to 48% in Butyl rubber containing a channel black.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and hexachlorophenol in any suitable manner and then heat this mixture at 275°–400° F. without simultaneously masticating it, the heat-treated mixture being subsequently masticated and compounded with conventional compounding and vulcanizing ingredients. The static heat treatment may be conducted by placing slabs of the stock in an oven heated to a suitable temperature, or slabs of the hot stock can be stacked up and allowed to stand for several hours, preferably under relatively non-heat-conductive conditions, in order to maintain the mixture at the temperature of 275°–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing rubber with a relatively large amount of rubber-reinforcing carbon black and from 0.5 to 3.0 parts of hexachlorophenol per 100 parts of said rubber, heating the mixture at a temperature above 275° F. at which the rubber is not harmed, masticating the mixture and completing incorporation of vulcanizing and other desired ingredients, shaping the mass, and vulcanizing the resulting shaped mass.

2. A process which comprises mixing rubber with a relatively large amount of rubber-reinforcing carbon black and from 0.5 to 3.0 parts of hexachlorophenol per 100 parts of said rubber, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and from 0.5 to 3.0 parts of hexachlorophenol per 100 parts of said rubber, masticating the mixture at a temperature of from 275° to 400° F., thereafter incorporating vulcanizing and other desired ingredients, shaping the mass, and vulcanizing the resulting shaped mass.

4. A process which comprises mixing a rubbery copolymer of isobutylene and a multi-olefinic unsaturate with a relatively large amount of a rubber-reinforcing carbon black and from 0.5 to 3.0 parts of hexachlorophenol per 100 parts of said rubbery copolymer, masticating the mixture at a temperature of from 275° to 400° F., thereafter incorporating vulcanizing and other desired ingredients, shaping the mass, and vulcanizing the resulting shaped mass.

References Cited in the file of this patent

UNITED STATES PATENTS

| Number | Name | Date |
|---|---|---|
| 2,315,850 | Gerke | Apr. 6, 1943 |